(12) United States Patent
Gonzaga (10) Patent No.: US 7,726,376 B2
(45) Date of Patent: Jun. 1, 2010

(54) LOCKING DEVICE FOR A TIRE MOUNTED ON A WHEEL RIM TO OPTIMIZE DYNAMIC BALANCING OF A TIRED WHEEL

(75) Inventor: Tullio Gonzaga, Correggio (IT)

(73) Assignee: Butler Engineering & Marketing S.p.A., Rio Saliceto (IT)

( * ) Notice: Subject to any disclaimer, the term of this patent is extended or adjusted under 35 U.S.C. 154(b) by 23 days.

(21) Appl. No.: 11/135,922

(22) Filed: May 23, 2005

(65) Prior Publication Data
US 2005/0257896 A1    Nov. 24, 2005

(30) Foreign Application Priority Data
May 24, 2004  (IT)  .......................... VR2004A0086

(51) Int. Cl.
*B60C 25/122* (2006.01)
(52) U.S. Cl. ..................................... 157/1.21; 157/1.1
(58) Field of Classification Search ................... 157/14, 157/1.1, 15–21, 1.24, 1.17, 1.21, 11
See application file for complete search history.

(56) References Cited

U.S. PATENT DOCUMENTS

| | | | | |
|---|---|---|---|---|
| 2,470,534 A | * | 5/1949 | Thomas | 157/1.24 |
| 2,497,644 A | * | 2/1950 | Watkins | 157/1.24 |
| 3,578,059 A | * | 5/1971 | Uhen et al. | 157/1.21 |
| 3,970,342 A | * | 7/1976 | Cotton | 294/86.4 |
| 4,163,468 A | * | 8/1979 | Mueller | 157/1.17 |
| 4,840,215 A | * | 6/1989 | Vijay et al. | 157/1.24 |
| 5,458,177 A | * | 10/1995 | Magnani | 157/1.24 |
| 5,826,319 A | | 10/1998 | Colwell et al. | |
| 6,234,232 B1 | * | 5/2001 | Kane et al. | 157/1.24 |

FOREIGN PATENT DOCUMENTS

| | | |
|---|---|---|
| DE | 23 33 057 A1 | 11/1985 |
| GB | 2 104 460 A | 3/1983 |
| JP | 60 236809 A | 1/1975 |
| JP | 03099908 A * | 4/1991 |

* cited by examiner

*Primary Examiner*—Hadi Shakeri
(74) *Attorney, Agent, or Firm*—Orum & Roth LLC

(57) ABSTRACT

The present invention relates to a locking device design to act between a tire and its respective wheel rim for dynamically balancing a tired wheel. The locking device is arranged to be installed on a tired-wheel maintenance machine having a support frame and a rotatable support for a wheel rim of a deflated tired wheel and locking-unlocking means for locking-unlocking the wheel rim to and from the rotatable support. The locking device comprises holding belt anchorable to the support frame and an engaging group designed removably to engage the tire of the deflated tired wheel, while its respective wheel rim is controllably angularly shifted.

23 Claims, 6 Drawing Sheets

LOCKING DEVICE FOR A TIRE MOUNTED ON A WHEEL RIM TO OPTIMIZE DYNAMIC BALANCING OF A TIRED WHEEL

BACKGROUND OF THE INVENTION

1. Field of Invention

The present invention relates to a locking device for a tire mounted on a wheel rim to optimize dynamic balancing of a tired wheel, particularly, but not exclusively, suitable for tire balancing machines, tire assembling-release machines and the like.

Balancing of a tired wheel is a delicate operation which in general has to be carried out with care by an operator as balancing could affect the road-holding of the vehicle and thus the safety of the passengers. As a matter of fact, a non-optimum balancing could result in vibrations and resonance phenomenons being caused owing to unbalanced forces or force resultants with respect during standard operation of the vehicle.

As it is known, the aforesaid forces are generated when a tired wheel is rotated about its axis of rotation owing to:
- uneven distribution of the wheel rim and tire mass of the tired wheel with respect to its axis of rotation;
- uneven distribution of the wheel rim mass due to misalignment between the inertial axis of rotation of the wheel rim and the axis of rotation of the tired wheel; and
- uneven distribution of the tire mass due to misalignment between the inertial axis of rotation of the tire and the axis of rotation of the tired wheel, e.g. owing to bad mounting of the tire.

2. Description of Related Art

Tired wheel balancing is usually carried out by means of a balancing machine comprising a rotatable support which can rotate about an horizontal or vertical axis of rotation and is provided, e.g. with jaws for engaging the tired wheel rim or with a grip headstock comprising a number of expansion arms and being rotatable about the same axis of rotation, or with a fixing flange having a pneumatic threaded-hub system. When the tired wheel is rotated, by the rotatable support, any mass imbalance with respect to the axis of rotation is detected by suitable sensor means, e.g. magnetic, optical or pressure sensor means, suitably connected to an electronic computer unit adapted to store and process data forwarded thereto. At this point, the standard procedure adopted to re-balance a tired wheel provides, as known, trying to eliminate such unbalances by adding sufficient additional masse-balance weights at suitably chosen positions. For correct positioning of such masses in most recent balancing machines use is made of optical pointers (lasers) controlled by the electronic computer that had previously reckoned the precise positioning of the mass-balance weights along the wheel rim edge.

When the weight of such additional masse-balance weights, however, exceeds a predetermined value, e.g. about 50 g, it is usually preferable to cause the tire to rotate about the axis of rotation of the tired wheel with respect to the wheel rim (or viceversa), so as to compensate, at least to a large extent, mass unbalances due to the wheel rim for those caused by the tire.

Such a tire rotation about the axis of rotation of the tired wheel is carried out as follows:
- the tired wheel is fixed on a rotatable support of a tire assembling-disassembling machine;
- the wheel tire is deflated and its bead is released; and
- the tire or the wheel rim is rotated, through an angle of about 180 degrees, with respect to the wheel rim or the tire, respectively.

To cause the tire to effect an angular rotation through about 180 degrees with respect to the wheel rim, no matter what tired-wheel maintenance machine is used, the operator usually acts on a suitable manually operated control, e.g. a pedal located on the base of the maintenance machine, thereby setting in rotation the rotatable support on which the wheel rim is secured. The wheel rim is thus set in rotation, and the tire is, in turn, caused to rotate owing to friction between the wheel rim edge and the tire bead.

The problem to be faced by the operator is to be able to lock or slow down any uncontrolled rotation of the tire that, due to friction, is dragged by the wheel rim secured to the rotatable support. Up to now, the operator has resorted to expedients, such as manually rotating the tire with respect to the wheel rim or manually slowing down the tire possibly by using a tool inserted between tire and wheel rim, while the maintenance machine causes the wheel rim to rotate. Such expedients are obviously troublesome and totally unsatisfactory.

This situation is even worse when a tire has a lowered bead or profile, as in this case the contact area between tire internal bead or edge and the wheel rim edge is much more extended than that provided in a standard tire, and thus the operator's task becomes much more difficult as higher strength is to be exerted in this operation in trying to stop or slow down tire rotation with respect to the wheel rim rotation. Moreover, with lowered profile tires use is made of alloy wheel rims that inevitably become damaged or at least scratched when tools are inserted between wheel rim and tire.

A further problem is faced when assembling and disassembling a special wheel tire. As a matter of fact, in order to mount a tire on a wheel rim the tire bead must get over and beyond the wheel rim edge, and thus the operator does force a portion of the tire bead by means of a suitable tool to exceed the wheel rim edge, after which care should be taken in gradually forcing the remaining tire bead to move beyond the wheel rim edge. Especially when dealing with wheels of large dimensions, e.g. truck or lorry wheels, the bead resistance to deformation is quite substantial, and thus it is quite difficult for the operator to accomplish the necessary steps to assembly or disassembly a tire.

SUMMARY OF THE INVENTION

The main object of the present invention is to provide a locking device arranged to block or slow down the rotation of a deflated tire dragged in rotation by a wheel rim on which it is, or is to be, mounted, thereby obtaining a controlled relative rotation of a tire with respect to its wheel rim.

Another object of the present invention is to provide a locking device suitable for preventing the tire or the wheel rim to become damaged while being assembled or disassembled onto or from each other.

Another object of the present invention is to provide a locking device that can be adapted to any type of tired-wheel maintenance machine.

A further object of the present invention is to provide a locking device that can be produced and operated at low costs, thereby substantially not to affect the overall costs of a maintenance machine in which the locking device is to be installed.

Another object of the present invention is to provide a locking device enabling an operator to mount-dismount a tire onto or from a wheel rim with a very limited effort.

These and other objects that will better appear below are achieved by a locking device for a tire in a tired-wheel maintenance machine which has a support frame, at least one rotatable support for a wheel rim mounted for rotation on said support frame and provided with blocking/unblocking means for said wheel rim, and driving means for said at least one rotatable support, said locking device comprising holding means anchorable to said support frame and comprising at least one engagement means suitable for removably at least partly engaging said tire of said tired wheel thereby preventing it from rotating, when its respective wheel rim is controllably angularly displaced by said drive means.

BRIEF DESCRIPTION OF THE DRAWINGS

Further features and advantages of the locking device according to the present invention will become better apparent from the following detailed description of a number of presently preferred embodiments thereof, given by way of non-limiting examples of carrying out the invention, with reference to the accompanying drawings, in which.

DESCRIPTION OF THE PREFERRED EMBODIMENTS

In the accompanying drawings, the same or similar parts or components have been indicated with the same reference numerals.

Figures 1, 2, 3:
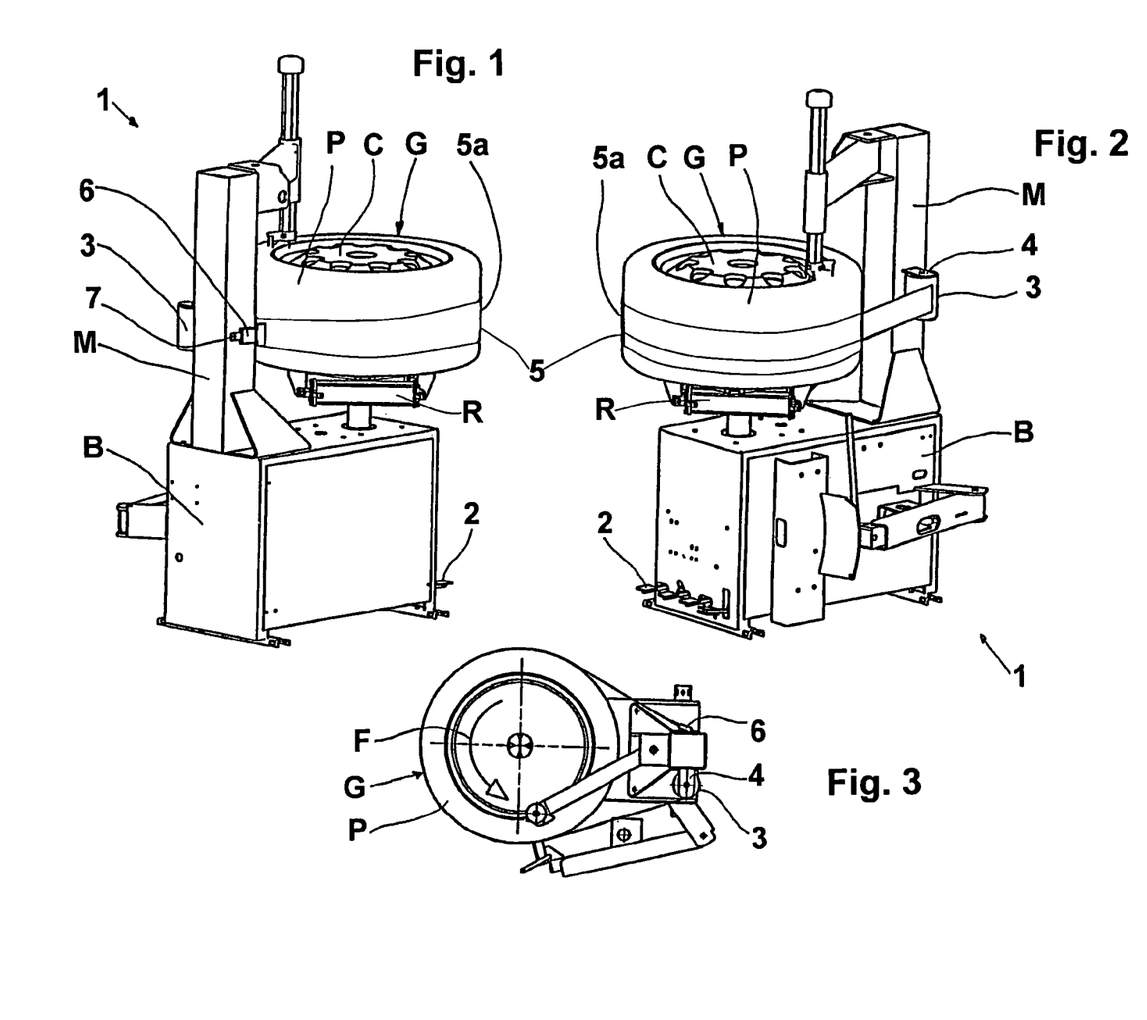
FIG. 1 shows a rear side perspective view of a tired-wheel maintenance machine (specifically a tire assembling-disassembling machine) with a wheel support plate which is mounted for rotation about a substantially vertical axis, tired-wheel maintenance machine being provided with a locking device according to the present invention.
FIG. 2 illustrates a top perspective view taken slightly from a side of the tired-wheel maintenance machine of FIG. 1.
FIG. 3 shows a top view of the tired-wheel maintenance machine of FIGS. 1 and 2.
Figure 4:
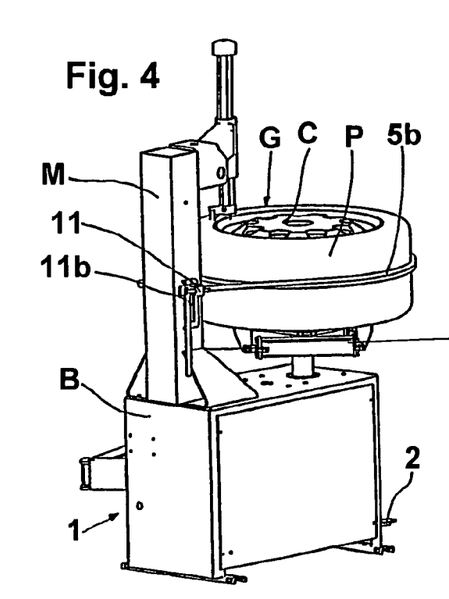
FIG. 4 illustrates a rear side perspective view of a tired-wheel maintenance machine provided with a locking device according to another embodiment of the present invention.
Figure 5:
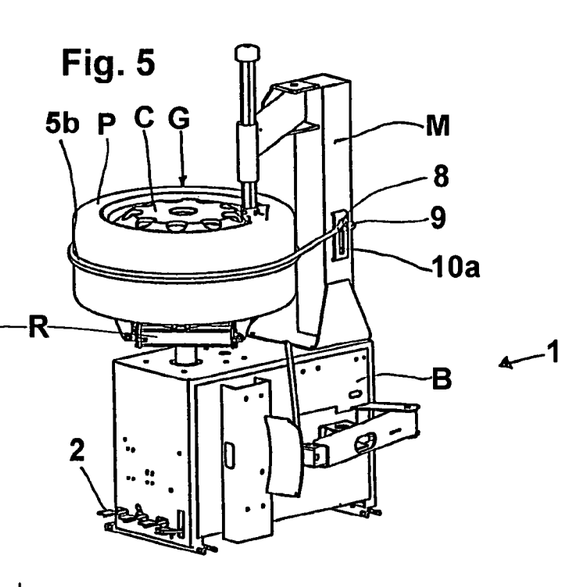
FIG. 5 shows a top perspective view taken slightly from a side of the tired-wheel maintenance machine of FIG. 4.
Figure 6:
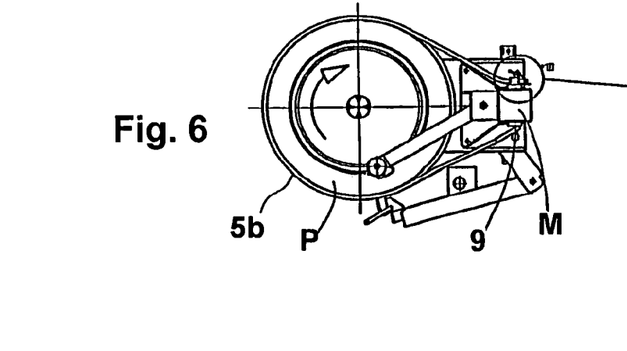
FIG. 6 is a top view of the maintenance machine provided with a locking device of FIGS. 4 and 5.
Figure 7:
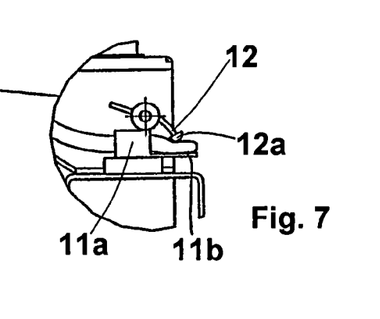
FIG. 7 is a partial view on an enlarged scale of a detail of the locking device of FIG. 6.

With reference first to FIGS. 1 to 3, it will be noted that a tired-wheel maintenance machine 1 has a support frame comprising a base B from the rear side of which an upright M extends upwards, whereas a rotatable support R raises at the front side thereof. The rotatable support R is designed to support a wheel rim C of a tired wheel G and comprises, e.g. a rotatable plate mounted for rotation about a substantially vertical axis and provided with blocking-unblocking means for the wheel rim C, e.g. expansion jaws of any suitable type or another suitable holding means. Control pedals 2 are provided at the lower portion of base B: one pedal controlling blocking-unblocking movements of the expansion jaws and the other the rotation of the rotatable plate R.

A suitable winding-unwinding reel or sprocket 3 is preferably spring-loaded, secured to the upright M, e.g. by means of support stirrups 4, and is part of a holding means 5, e.g. a flexible belt 5a made of any suitable material having a relatively high friction coefficient, the belt having one end thereof anchored to the winding sprocket 3 and being arranged to be wound-unwound onto and from the sprocket. The other end of the belt 5a removably fixed to a connection means 6, e.g. comprising a buckle-like member designed to engage, preferably by a snap-engagement, with an anchoring means 7, generally a sheath member secured to the upright M, preferably at a side opposite to that of the winding sprocket 3, and provided with a suitable release button, the whole like a coupling-uncoupling device for a vehicle safety belt.

After the wheel rim C is secured by the expansion jaws to the rotatable support of the maintenance machine 1, the tired wheel G is deflated, if required, and the bead of tire P is released from the wheel rim edge by any suitable means. The belt 5a is then pulled out by being unwound from sprocket 3, and wrapped once or twice around the tread of tire P, after which the buckle 6 is snap-engaged into the sheath 7. Thus, tire P by being constrained to the belt 5a is prevented from rotating with the wheel rim. When the operator presses the suitable pedal 2, the wheel rim C on the rotatable plate R is set in rotation and the friction generated between the wheel rim C and the tire P at its beads would drag in rotation also the tire P. However, such a friction is opposed and exceeded by friction generated between the belt 5a and tread of tire P.

As it will be noted in FIG. 3, the position of the winding sprocket 3 on the upright M and the anchoring sheath 7 is such that owing to angular displacement of tire P in the direction of arrow F, the belt 5a is tightened with respect to the anchoring sheath 7 thereby enhancing the pressure and consequently the friction force exerted onto the tread of tire P. With this arrangement the wheel rim can be easily rotated about the axis of rotation of the tired wheel G, through a predetermined angle while the tire is held in position.

In FIGS. 4 to 7 another embodiment of a locking device according to the present invention is illustrated, in which holding means 5b is constituted by one or more ropes or cables having an end eyelet or ring 8 designed permanently or removably to engage with an anchoring member 9, e.g. a pin-shaped member having a knob head and being mounted in, and overhangingly protruding from, the upright M of the maintenance machine 1.

Preferably, the pin-shaped member 9 is slidably engaged through a guide slit 10a formed in the upright M for positioning the end eyelet or ring 8 of the rope 5b at different levels thereby making it possible to locate tires P arranged on the rotatable plate R of the maintenance machine 1 at different heights. Another guide slit 10b is formed in the upright on its opposite side to the guide 10a, and designed to slidably engage with a pin member 11, whose end protruding from the upright M has an eyelet 11a to be engaged by the other end of the rope 5b. As it will be noted in FIG. 7, at eyelet 11a the pin member 11 supports an overhanging plate 11b which extends perpendicularly to the pin member 11 so that it can receive and support the rope or wire portion 5b passing through the eyelet 11a. A shaped end 12a of a pawl 12, which is preferably spring-loaded, is designed to act against and close to the plate 11b, and thus the rope or wire portion 5b crossing the eyelet 11a becomes engaged by the end 12a of the pawl 12 and is prevented from moving.

From a practical operational point of view, after the rope 5b has been wound and manually tightened about the tread of tire P, its free end threaded is passed through the eyelet 11a and locked in position by pawl 12. As it will be better noted in FIG. 6, when pedal 2 is actuated by the operator, the rotatable plate R to which the wheel rim C is secured is set in rotation about the axis of tired wheel G. The friction thus generated between wheel rim C and tire P will cause tire P to start rotating thereby tightening the rope 5b at the side of the eyelet 8 and thus increasing the pressure and consequently the friction between rope or wire 5b and tread of tire P, which results in a desired angular displacement of the tire with respect to the wheel rim on which it is mounted.

Figures 8, 9, 10:
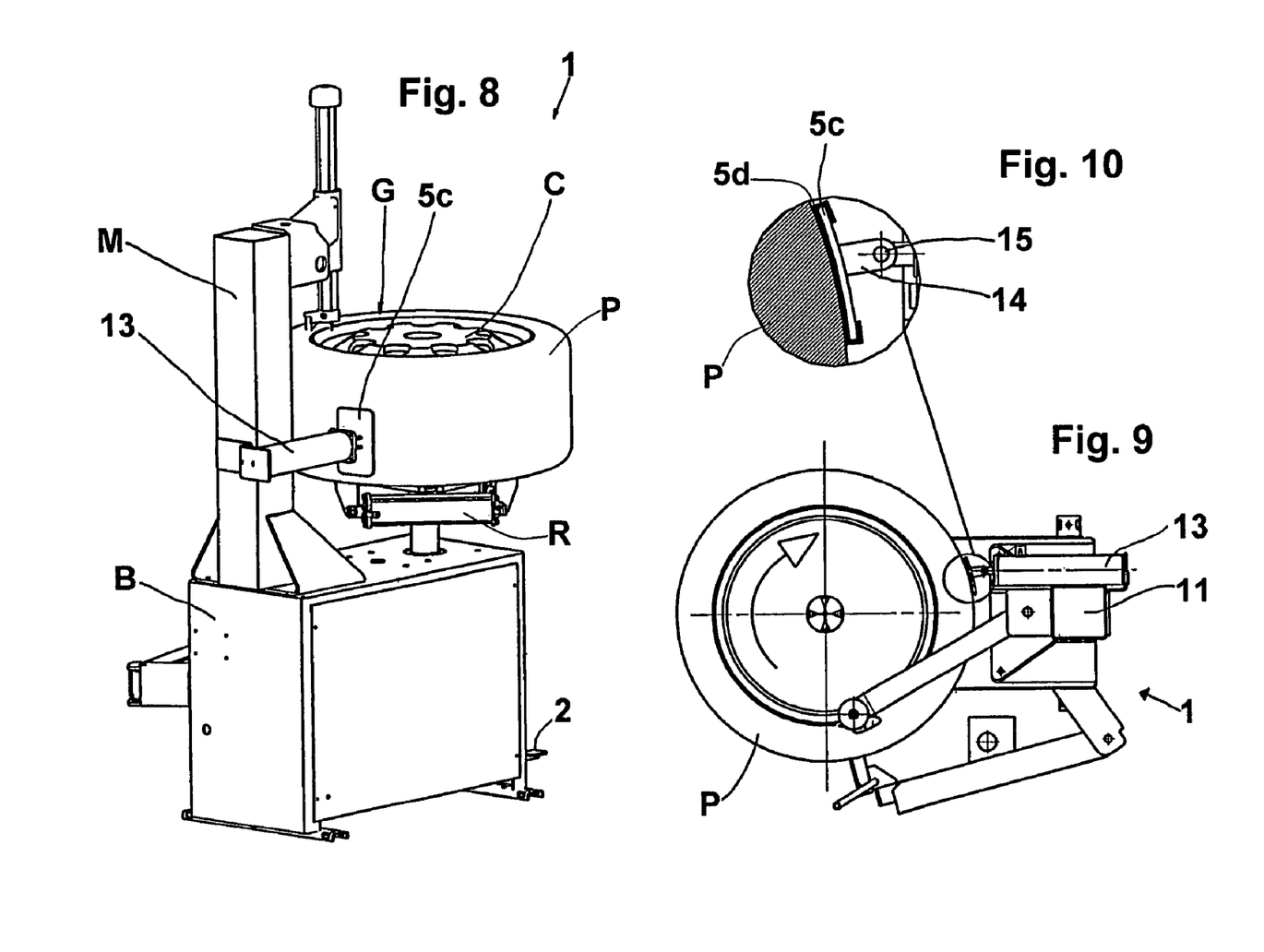
FIG. 8 shows a rear side perspective view of a tired-wheel maintenance machine provided with a locking device according to another embodiment of the present invention.
FIG. 9 is a top view of the tired-wheel maintenance machine and its locking device of FIG. 8.
FIG. 10 illustrates a detail on an enlarged scale of the locking device of FIG. 9.

FIGS. 8 to 10 show another embodiment of a locking device according to the present invention having holding means comprising a block or shoe 5c, preferably made or covered by a high-friction coefficient material, e.g. rubber 5d. The block 5c is secured to one end of an arm 13 overhangingly extending from, and supported by, the upright M, e.g. welded or bolted to it, in such a manner that the block 5c is facing and close to the tread of tire P of a tired wheel G placed on the rotatable plate R. The block 5c is preferably articulated to arm 13, e.g. by means of a pair of lugs 14 and pin 15.

Advantageously, arm 13 extends in an offset or angularly shifted direction, e.g. through 15°-20°, from its radial attitude with respect to the tired wheel G.

Figure 11:
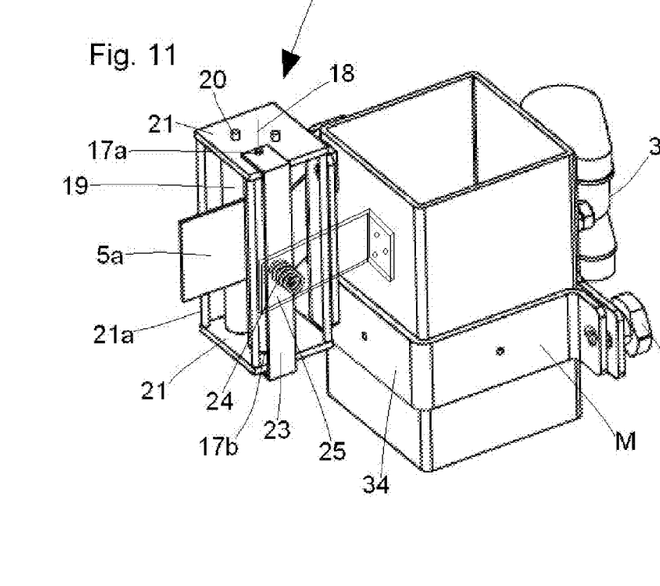
FIG. 11 is a diagrammatic perspective view of an embodiment of a retaining device for a friction tape.
Figure 12:
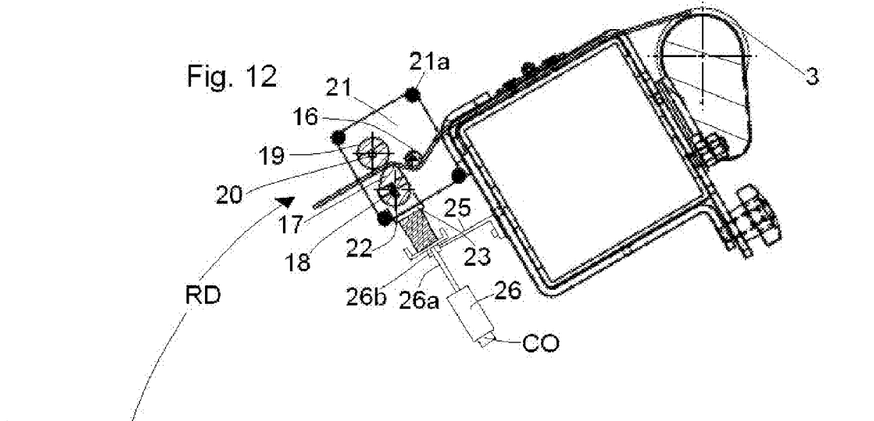
FIG. 12 is a cross-section view of the retaining device of FIG. 1 with the addition of a controlled servo-motor.

FIGS. 11 and 12 show a retaining device RD for winding-unwinding a flexible engagement means, e.g. a belt 5a, one or more ropes 5b and the like. The retaining device RD comprises a rotatable eccentric roller or cylinder 17, whose axis of rotation 18 extends transversely to the engagement means, and an idle roller or cylinder 19, free to rotate about an axis of rotation 20 parallel to the eccentric roller axis of rotation 18. Eccentric roller 17 and idle roller 19 are located in a cage structure anchored to the upright M substantially at the same level as, and away from, the sprocket 3. The cage structure comprises a top and a bottom plates 21 extending transversally to the axes of rotation 18 and 20 and connected together by studs 21a. A slot 22 is formed in each plate 21. The eccentric roller 17 has a pair of opposite pins: an upper pin 17a and a lower pin 17b, both axially protruding from it and designed to pass through a respective receiving slot 22 and a respective arm of a U-shaped stirrup 23 which preferably extends over and beyond the two plates 21 parallel to the eccentric roller 17. Thus the eccentric roller 17 is displaceable in the slots 22 between an unblocking position at a predetermined distance away from the idle roller 19, and a blocking position, in which the pins 17a, 17b have been shifted along the slots 22 so that the eccentric roller 17 is close to the idle roller 19.

The belt 5a, unwound from sprocket 3, can pass around the upright M, be deviated, e.g. by a small pole 16, preferably extending parallel to the axes of rotation 18 and 20, enter the gap GA (FIG. 13) between the eccentric roller 17 and the idle roller 19, and then brought by the operator around and into contact with the tire tread of a tired wheel.

When the eccentric roller 17 is in its unblocking position the belt 5a or rope 5b is free to slide through the gap GA, whereas when the eccentric roller is in its blocking position the belt 5a or rope 5b is locked between the eccentric roller 17 and the idle roller 19 and cannot be further unwound.

The U-shaped stirrup 23 is spring loaded by any suitable resilient means, e.g. one or more helical springs 24 (FIG. 11), the spring 24 having a pre-determined module of elasticity so that it will yield only when a threshold load applied thereto, i.e. to the U-shaped stirrup 23, and thus to the eccentric roller 17, is reached, and reacting against a fixed support, e.g. a stirrup 25 anchored to the upright M in any suitable manner.

In another embodiment of the invention shown in FIG. 12, the eccentric roller 17 is arranged to be displaced towards and away from the idle roller 19 by a suitable actuator means, e.g. by a threaded output shaft 26a of a servo-motor 26 controlled by a suitable controller CO of any suitable type, the output shaft 26a being engaged in a fixed nut 26b supported by a stirrup 25.

In an advantageous modification, spring or springs 24 are designed to act against the U-shaped stirrup 23 and to react against a disc plate 25a arranged to be controlled by the output shaft 26a.

Figure 13:
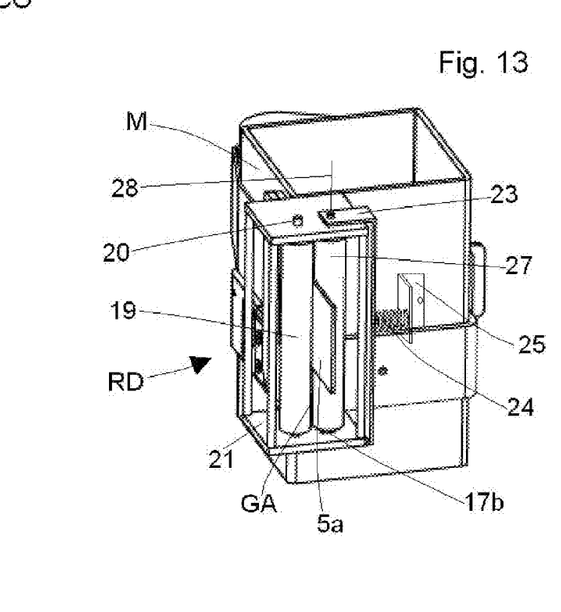
FIG. 13 is a diagrammatic perspective view of another embodiment of a retaining device for a friction tape.

FIG. 13 shows a retaining device similar to that shown in FIGS. 11 and 12 except that the eccentric roller 17 is replaced by a displaceable roller 27 which can rotates about an axis of rotation 28.

Figure 14:
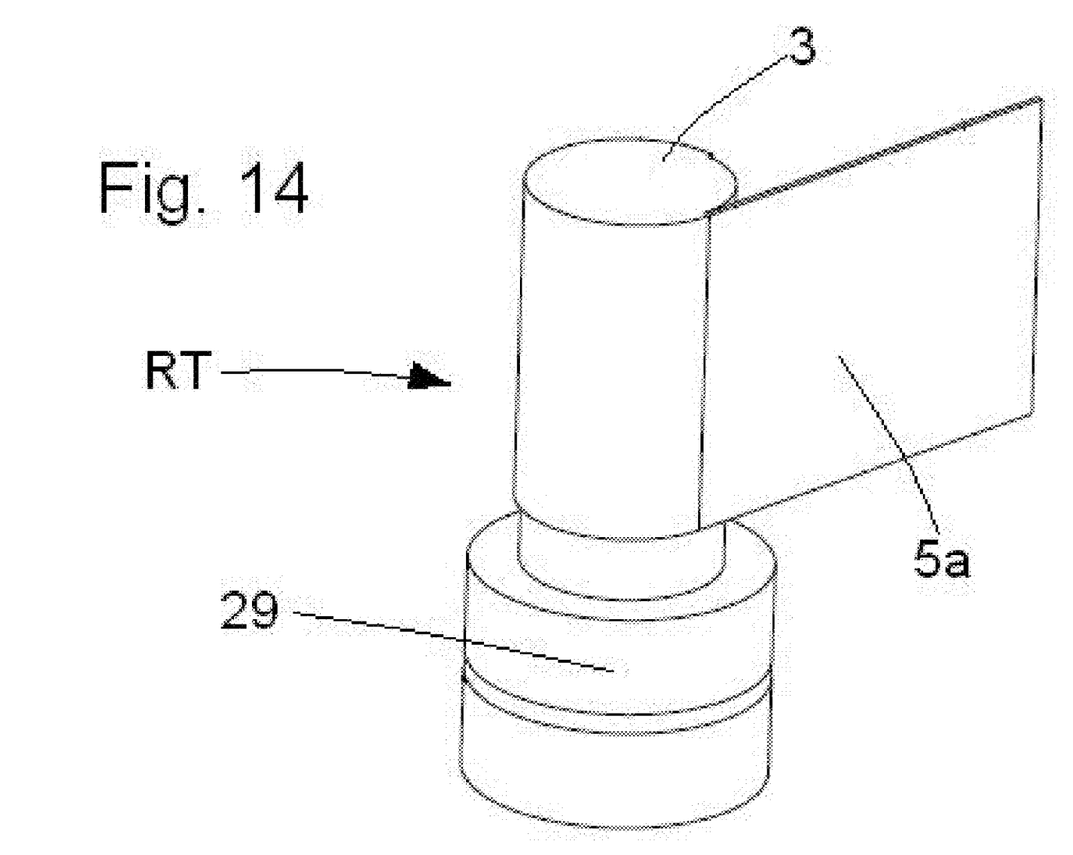
FIG. 14 shows a diagrammatic perspective view of another embodiment of a retaining device for a friction tape co-operating with a tape winding-unwinding reel.

According to another embodiment of the retaining device RD shown in FIG. 14, the sprocket 3 is provided with a clutch means 29 of any suitable type which is calibrated to yield when the engagement means (belt 5a, rope 5b) is subjected to a limit pulling force, i.e. when the tire of a tired wheel G on the rotatable plate R is set in rotation owing to friction between the engagement means and the tire tread.

Figures 15, 16:
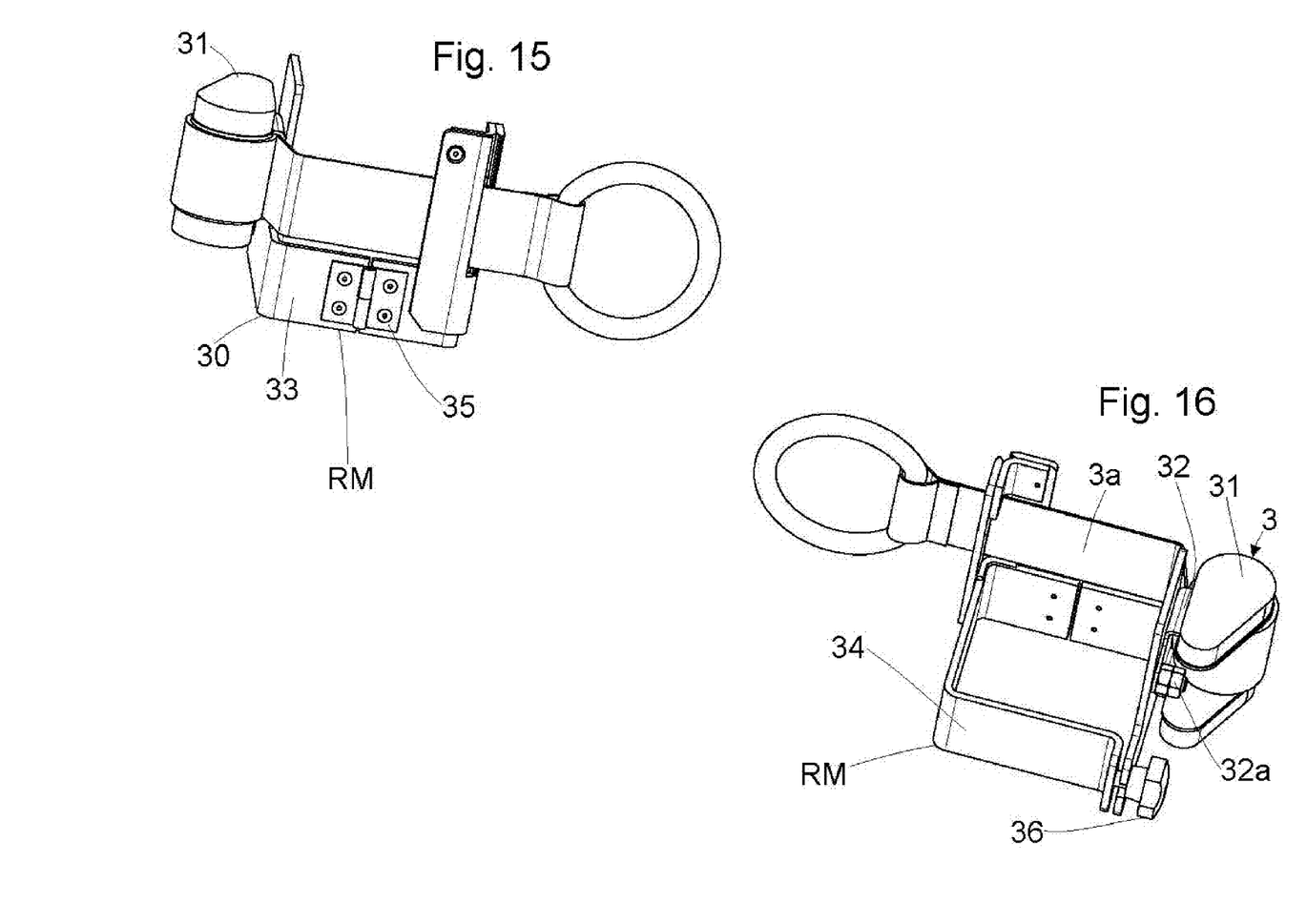
FIGS. 15 and 16 are diagrammatic perspective views of a sprocket according to the present invention provided with anchoring means to an upright.

With reference to the embodiment shown in FIGS. 15 and 16, a sprocket or reel arrangement 3 secured to the upright M by anchoring means 30 is shown. The sprocket arrangement 3 is laterally fixed to two brackets 31 by means of fastening means, e.g. bolts not shown in the drawings. A stirrup 32 overhangingly supports the two bracket 31 and is secured, e.g. by one or more bolts 32a, to a L-shaped strap 33, which can be fixed to a C-shaped plate 34, preferably with interposition of a hinge device 35. The L-shaped strap 33 and the C-shaped plate 34 constitute a ring member RM delimiting an inner open space suitable to receive therein a length of the upright M, thereby making it possible for the ring member to be deformed at the hinge device 35 to directly surround to the upright M and to be secured thereto by tightening a screw 36 into threaded matching holes formed at one end of the L-shaped strap 33 and at one end of the C-shaped plate 34, respectively, as is better shown in FIGS. 11, 12 and 16.

A retaining device, as described above with particular reference to the embodiments in FIGS. 11 to 14, makes it possible to easily complete mounting of a tire onto, or disassembling from, a wheel rim. Especially when dealing with tires of relatively large dimensions, after the wheel rim has been positioned on the rotatable support R, a tire P is located onto the wheel rim and usually no specific difficulty is faced in mounting the first bead of the tire even because the tire can be inclined with respect to the axis of rotation of the rotatable support R. For mounting the other tire bead, a relatively short bead portion thereof is first forced into the wheel rim by means of a suitable manually operated mounting-dismounting tool, and the rotatable support R is set in rotation by pressing pedal 2 while the mounting-dismounting tool is kept stationary. Either before or after forcing a bead portion into the wheel rim, an engagement means 5a or 5b is wound as explained above around the tire tread in order to engage, mostly by friction, the tire thereby substantially preventing it from rotating with the rotatable support R, thus causing progressive mounting of the entire tire bead.

In a first step, the rotatable support R starts rotating in a predetermined direction, thereby tightened the engagement means. The eccentric roller 17 or the displaceable roller 27 is then in its unblocked position and the spring 24 is not loaded (FIG. 11). When the force applied on the eccentric roller 17 by the belt 5a or rope 5b is such as to overcome the spring resistance, the spring 24 is deformed and thus the eccentric roller 17 is displaced to its blocking position to avoid damaging the sprocket 3 owing to high unwinding speed of the belt 5a or rope 5b.

In the embodiment shown in FIG. 12, when the rotatable support R reaches a speed of rotation such that a limit torque is transmitted to the engagement means, the controller CO controls the servo-motor 26 which actuates the disc plate 25a, and thus possibly through spring 24 displaces the U-shaped stirrup 23, i.e. the roller 17 along the slots 22 towards its blocked position, whereby preventing further unwinding of engagement means 5a, 5b to take place.

The locking device as described above is susceptible to numerous modifications and variations within the scope as defined by the claims.

Thus, for example, the anchoring means in the embodiments described referring to FIG. 1 to 7 instead of comprising coupling members on both the side of the upright M could comprise only an anchoring means for both the end of the belt 5a or of the rope or wire 5b.

Moreover, the maintenance machine could be provided with a control device for the driving means of the rotating plate R, which allows, every time the operator pushes the proper pedal 2, the plate to rotate through a predetermined angle, e.g. 180 degrees, thus avoiding inaccuracy in the mutual angular movement between wheel rim and tire.

The invention claimed is:

1. A locking device for a tire in a tired-wheel maintenance machine, the machine comprising:
   a support frame,
   at least one rotatable support for a wheel rim mounted for rotation on said support frame,
   a blocking/unblocking element for said wheel rim,
   a driving element for said at least one rotatable support, and
   said locking device comprising a holding element anchorable to said support frame and including at least one flexible element suitable for removably at least partly engaging said tire of a tired wheel and imparting a tangential force to said tire, thereby preventing the tired wheel from rotating, and facilitating relative rotation between the tire and the rim, when a wheel rim of the tired wheel is controllably angularly displaced by said drive element,
   said at least one flexible element arranged to be wound around, and unwound from a reel member mounted for rotation on said support frame,
   said device further comprising a deformable ring member removably securable around an upright member of said tired-wheel maintenance machine,
   said ring member comprising:
      a linking element for anchoring said reel member, said linking element including an L-shaped strap and a C-shaped plate, said L-shaped strap being securable to said C-shaped plate by engaging a screw element into a respective opening in said L-shaped strap and said C-shaped plate.

2. A device as claimed in claim 1, wherein said holding element comprises at least one anchoring member for said at least one flexible element.

3. A device as claimed in claim 2, wherein said at least one flexible element has one end thereof wounded around said reel member and its other end secured to a coupling element designed removably to engage with said anchoring member.

4. A device as claimed in claim 3, wherein said coupling element comprises a buckle member and said anchoring member comprises a sleeve member arranged to receive and snap engage with said buckle member.

5. A device as claimed in claim 1, wherein said reel member comprises at least one bracket element, at least one stirrup overhangingly supporting said at least one bracket element.

6. A device as claimed in claim 1, wherein said at least one flexible element comprises a belt member.

7. A device as claimed in claim 1, wherein said at least one flexible element comprises a rope or a wire member.

8. A device as claimed in claim 1, wherein said at least one flexible element has, in use, at least one end thereof anchored to a respective anchoring member.

9. A device as claimed in claim 1, wherein said at least one flexible element has one end secured to an anchoring member and its other end removably engaging with a removable anchoring member.

10. A device as claimed in claim 9, wherein said anchoring member comprises a headed pin element.

11. A device as claimed in claim 9, wherein said removable anchoring member comprises an eyelet or sleeve member and a spring loaded pawl.

12. A device as claimed in claim 9, wherein said anchoring member and said removable anchoring member are located at different levels.

13. A device as claimed in claim 1, further comprising at least one retaining unit arranged controllably to prevent said at least one flexible element from being unwound from said reel member.

14. A device as claimed in claim 1, wherein said device further comprising at least a retaining unit, said retaining unit comprising a first cylinder or roller and a second cylinder or roller both mounted for rotation about substantially parallel axes of rotation to delimit there between an interspace or gap, and a control element arranged to displace one of said first and second cylinders with respect to the other between an unblocking and blocking position in which said at least one flexible element is blocked in said interspace.

15. A device as claimed in claim 14, wherein said first cylinder is an eccentric cylinder.

16. A device as claimed in claim 14, wherein said first cylinder and said second cylinders have each a pair of axially extending projecting pin members and are mounted for rotation in a cage structure designed to be anchored to said upright and comprising a top and a bottom plates extending transversally to said first and second cylinders, anchoring element suitable for connecting together said top and bottom plates, at least one slot formed in each top and bottom plates arranged slidably to receive therein a respective axial pin member of one of said first and second cylinders, thereby allowing it to perform displacements between said blocking and unblocking positions, and a U-shaped stirrup member arranged rotatably to engage said axial pin members received in said slots and to be controlled by said control element.

17. A device as claimed in claim 16, wherein said U-shaped stirrup member is spring loaded by a suitable resilient element.

18. A device as claimed in claim 16, wherein said U-shaped stirrup member is spring loaded by suitable resilient element, said suitable resilient element being arranged to react against a fixed support carried by said upright.

19. A device as claimed in claim 16, wherein said U-shaped stirrup is arranged to be controlled by drive element.

20. A device as claimed in claim 14, wherein said retaining unit comprises a clutch member.

21. A method for mounting a tire onto a wheel rim comprising the following steps:

providing a locking device for a tire in a tired-wheel maintenance machine, the machine comprising a support frame, at least one rotatable support for a wheel rim mounted for rotation on said support frame, a blocking/unblocking element for said wheel rim, a driving element for said at least one rotatable support, and said locking device comprising a holding element anchorable to said support frame and including at least one flexible element suitable for removably at least partly engaging said tire of a tired wheel and imparting a tangential force to said tire, thereby preventing the tired wheel from rotating, and facilitating relative rotation between the tire and the rim, when a wheel rim of the tired wheel is controllably angularly displaced by said drive element, said at least one flexible element arranged to be wound around, and unwound from a reel member mounted for rotation on said support frame, said device further comprising a deformable ring member removably securable around an upright member of said tired-wheel maintenance machine, said ring member comprising a linking element for anchoring said reel member, said linking element including an L-shaped strap and a C-shaped plate, said L-shaped strap being securable to said C-shaped plate by engaging a screw element into a respective opening in said L-shaped strap and said C-shaped plate;

positioning a wheel rim onto the rotatable support;

locating a tyre comprising a tread portion, a first and a second bead onto said wheel rim;

forcing by means of a manually operated mounting-dismounting tool, a portion of said first or said second bead into said wheel rim;

setting into rotation said rotatable support, keeping said mounting-dismounting tool stationary; and wounding said least one flexible element around a portion of tread of said tyre in order to engage said tyre thereby substantially preventing it from rotating with the rotatable support.

22. A method claim as claimed in claim 21, comprising, before said step setting into rotation said rotatable support, the following step:

mounting said first bead of said tyre onto said wheel rim by means of said mounting-dismounting tool.

23. A locking device for a tire in a tired-wheel maintenance machine, the machine comprising:

a support frame, at least one rotatable support for a wheel rim mounted for rotation on said support frame, a blocking/unblocking element for said wheel rim, a driving element for said at least one rotatable support, and said locking device comprising a holding element anchorable to said support frame and at least one flexible element suitable for removably at least partly engaging said tire of a tired wheel and imparting a tangential force to said tire, thereby preventing the tired wheel from rotating, and facilitating relative rotation between the tire and the rim, when a wheel rim of the tired wheel is controllably angularly displaced by said drive element:

said at least one flexible element arranged to be wound around, and unwound from a reel member mounted for rotation on said support frame;

said device further comprising at least a retaining unit, said retaining unit comprising a rotatable eccentric roller or cylinder and an idle roller or cylinder, free to rotate about an axis of rotation parallel to the eccentric roller axis of rotation to delimit therebetween an interspace, and a control element arranged to displace said eccentric roller with respect to the idle roller between an unblocking position of the at least one flexible element in which the eccentric roller is at a predetermined distance away from the idle roller, and a blocking position of the at least one flexible element, in which the eccentric roller is closer to the idle roller and the at least one flexible element is locked between the eccentric roller and the idle roller in said interspace.

* * * * *